E. E. BANES.
FEEDING TWYER FOR ORE TREATING FURNACES.
APPLICATION FILED JUNE 12, 1911.

1,073,463.

Patented Sept. 16, 1913.

UNITED STATES PATENT OFFICE.

ERNEST EDMUND BANES, OF STRATHFIELD, NEAR SYDNEY, NEW SOUTH WALES, AUSTRALIA.

FEEDING-TWYER FOR ORE-TREATING FURNACES.

1,073,463. Specification of Letters Patent. Patented Sept. 16, 1913.

Application filed June 12, 1911. Serial No. 632,706.

*To all whom it may concern:*

Be it known that I, ERNEST EDMUND BANES, a subject of the King of Great Britain and Ireland, residing at 5 The Avenue, Strathfield, near Sydney, in the State of New South Wales, Australia, have invented a new and useful Feeding-Twyer for Ore-Treating Furnaces, of which the following is a specification.

My invention relates to a furnace fitting for introducing powdered ore or concentrate, with or without admixture powdered fuel, into a hot atmosphere containing gases with which reaction of mineral matter is required to be effected. It has been devised particularly for introducing mineral products such as ore concentrates into a hot oxidizing atmosphere in such a way as to insure the uniform oxidation of the mineral while it is suspended in a dispersed condition in a gaseous vehicle.

The said fitting consists of a blowpipe, characterized by a central worm or auger feeder for delivering the mineral into the base of a blowpipe flame which is produced by the combustion of fuel gas and air which are emitted under pressure out of annular nozzles which surround the end of the mineral feeder. The mineral feed is brought into the core of the flame by a whirling blast of air emitted through a spiral nozzle whereby the blowpipe flame is spread and the mineral matter dispersed into it. The proportion of air and gas and the nature of the gas fed to the flame are under control, and the action of the flame on the mineral passing through it is thus variable at the will of the operator. Oxygen may be used wholly or partially instead of air, and the fuel gas may be producer gas, acetylene, or other known gas applicable for the production of a hot flame. When the mineral is volatilizable and a sufficient temperature is attained in the flame the mineral is delivered out of the flame in a volatilized condition. In the case of non-volatile minerals, reduction or oxidation may be effected more or less completely within the flame, and when the atmosphere into which the flame is projected is sufficiently hot and sufficiently rich in oxygen the solid or volatile products delivered out of the flame suffer oxidation therein if oxidizable.

Figure 1:
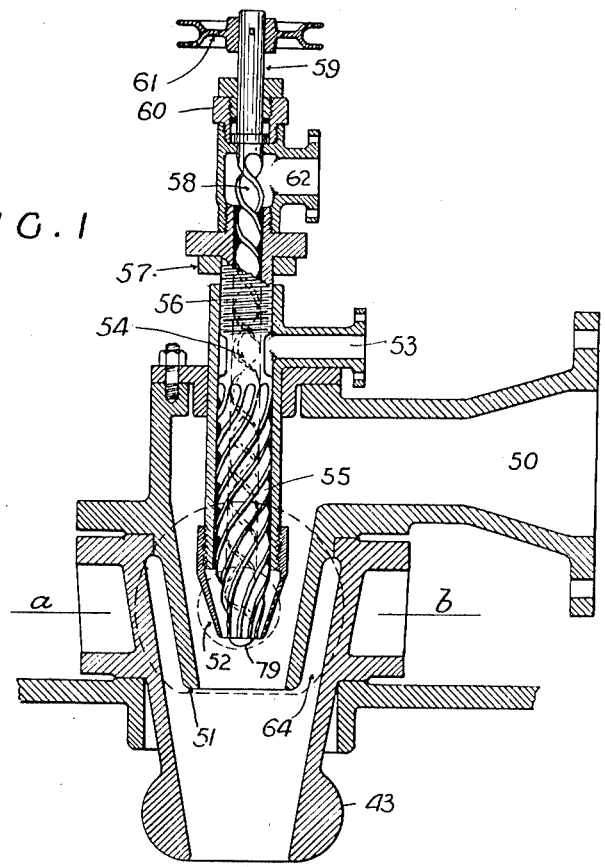
Figure 2:
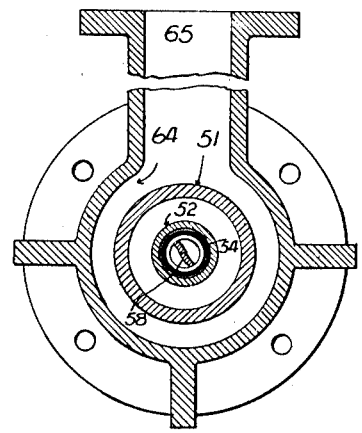

In the annexed explanatory drawings:—
Figure 1 is a longitudinal sectional elevation through a blowpipe feeder according to my invention, and Fig. 2 is a transverse section on line *a—b* Fig. 1.

The feeder consists of three open conically ended annular nozzles 43, 51, and 52 with a concentric throat in a liner 54 contained within the nozzle 52. In this throat an auger screw feeder 58 is rotated. Ore is fed forward to the point of the nozzle 52 by means of the auger screw feeder 58 at a rate determined by the speed of rotation of said auger screw feeder. At the point of emission at the end of the liner 54, the ejected mineral in a fairly powdered condition is caught up by a whirling ring jet of air under pressure (entering at the connection 53) and projected out through the concentrically surrounding nozzles 51 and 43, through the former of which gas and through the latter of which air is forced under pressure. Gas enters through the neck 50, and the surrounding collar of air enters through the neck 65. Ore is fed through the neck 62 near the base of the auger screw 58; the stem of said screw works in a stuffing box and upon its outer end is fitted a belt or gear wheel 61 by which rotation is imparted to it from any mechanical drive. The extreme forward end of the auger screw 58 is tapered off as indicated. The position of the liner 54 in relation to the conical point of the nozzle 52 is regulated by turning it on its screwed neck 56 and fixing it when adjusted by means of the backnut 57. When the liner 54 is set, exit is allowed in required volume for the whirling air blast which carries the powdered mineral matter into the blowpipe flame.

In practice, for effecting oxidizing reactions, air is introduced through the necks 53 and 65 and gas through the neck 50, but this order of connection may be changed; oxygen may be supplied instead of air and any suitable fuel gas may be burned. The gas may for instance be introduced at the neck 53 instead of at the neck 50, or gas may be introduced at the neck 65 and at the neck 53, and air introduced at the neck 50, the construction of the fitting being in every such case practically identical. The mineral matter fed into the neck 62 must be finely powdered; it may contain sulfur or other combustible material or may have fuel in the form of powdered coal, coke, or charcoal intermixed with it. The column or blast of mixed air gas and solid matter is ejected through the point of the nozzle 43 and when inflammable may be lighted at the point of said nozzle. Ordinarily the fitting will be attached to a furnace wall, the atmosphere within the furnace being of such gaseous composition and maintained at such temperature as will insure the occurrence of the reactions required to be produced. Thus when galena is required to be volatilized and the volatile product oxidized, the furnace is made to contain a hot oxidizing atmosphere and solid fuel is not mixed with the feed unless the feed is deficient in sulfur, ordinary producer gas and air being used in the blast. Under such circumstances the finely powdered galena is dispersed through the flame and volatilized therein and delivered out of the flame in a volatilized condition into a hot oxidizing atmosphere where it is converted into a basic sulfate of lead or similar product.

In order to preserve uniformity in the operative conditions, the rate of feed of mineral matter must be proportionate to the volume of air and gas contained in the blast; such condition is insured by driving the pulley 61 and the positive pressure blower by which the fitting is fed with air or oxygen from the one source of power, whereby a change in the rate of feed of one of them cannot occur without a corresponding change in the rate of feed of the other.

The method of operation is as follows:—
The fitting being attached to a support which may be the wall of a furnace containing a regulated atmosphere, rotation is applied to the wheel 61, air is forced into the necks 53 and 65, gas is introduced into the neck 50, and mineral matter in a powdered condition is fed into the neck 62. The mineral matter is delivered forward by the auger screw 54 and ejected in a regular stream at the point of the nozzle 52; there it is caught up in the whirling blast of air which is rifled in passing through the spiral grooves 55 on the outer part of the liner 54. This whirling jet of air and mineral matter is surrounded by a collar of inflammable gas which passes out through the nozzle 51, and said gas collar is encircled again by a collar of air passing through the nozzle 43. The mineral matter, air, and gas become more or less dispersed the one into the other and intermixed when they have passed the end of the nozzle 43, and the jet being there inflamed, the mineral matter is acted upon within the flame while held in a state of suspension, and passes out of the flame after suffering volatilization, or a reducing or oxidizing reaction. The products are collected in any convenient manner depending upon the manner of application of the invention. When the fitting is applied to a furnace, portion of the product may be recovered as fume or gas at the throat of the furnace, while gangue and solid products will be dropped through the furnace atmosphere and will be recovered by removal from the bottom of the furnace.

What I claim as my invention and desire to secure by Letters Patent is:—

1. A metallurgical furnace fitting consisting of concentric nozzles with air and gas connections respectively, a hollow fitting concentric with said nozzles, a hollow liner within said fitting and forming with the interior of said fitting a plurality of spiral passageways, an auger screw conveyer within said liner and connections for feeding air and powdered mineral respectively to said spiral passageways and said auger screw.

2. In a metallurgical blowpipe, the combination with concentric air and gas nozzles, of a central nozzle fitted with a hollow liner spirally grooved externally and adjustable longitudinally in said central nozzle, an auger screw conveyer within said liner, and gas air and powdered mineral feed connections to said nozzles and auger screw conveyer respectively.

3. The combination of nozzles 43, 51, and 52, and feed connections thereto, externally spirally grooved liner 54 adjustable longitudinally in the nozzle 52, auger screw feeder 58 with tapered end contained within the liner 54, means for rotating said feeder, and a mineral feed neck 62 at the base of said feeder.

4. In a metallurgical blow pipe, the combination, with concentric air and gas nozzles, of a central axial hollow fitting having a frusto-conical tip, a hollow liner in said fitting and forming with said fitting a plurality of spiral passageways, an auger screw conveyer within said liner, connections for conveying air to said spiral passageways and powdered mineral to said auger screw conveyer respectively, and means for adjusting the distance between said frusto-conical nozzle and liner whereby the air feed may be regulated, and the direction of its impact upon the mineral feed may be varied.

5. In a metallurgical blow pipe, the combination, with concentric air and gas nozzles, of a hollow liner concentric with all of said nozzles and projecting into the innermost of said nozzles, the end of said liner being spaced from the tip of said innermost nozzle so as to define a narrow annular discharge outlet, an auger screw conveyer within said liner, connections for feeding air and gas respectively to said first nozzles, connections for feeding powdered mineral to said conveyer, and means for delivering through said discharge outlet a whirling blast of air.

6. In a metallurgical blow pipe, the combination, with a nozzle having connections for the supply of combustible gaseous fuel, said nozzle being substantially circular in cross section and having an unimpeded delivery aperture, of means for delivering finely divided mineral to the center of said nozzle, and means for imparting to such mineral a spiral whirling motion about the axis of said nozzle, combined with a forward movement along the axis thereof.

In testimony whereof I have signed my name to this specification in the presence of two subscribing witnesses.

ERNEST EDMUND BANES.

Witnesses:
W. J. DAVIS,
O. N. J. CANDRICK.